United States Patent
Zhu et al.

(10) Patent No.: US 12,055,423 B2
(45) Date of Patent: Aug. 6, 2024

(54) METHOD FOR ASCERTAINING A PHYSICAL PARAMETER OF A GAS-CHARGED LIQUID

(71) Applicant: Endress+Hauser Flowtec AG, Reinach (CH)

(72) Inventors: Hao Zhu, Freising (DE); Wolfgang Drahm, Freising (DE); Alfred Rieder, Landshut (DE)

(73) Assignee: Endress+Hauser Flowtec AG, Reinach (CH)

(*) Notice: Subject to any disclaimer, the term of this patent is extended or adjusted under 35 U.S.C. 154(b) by 490 days.

(21) Appl. No.: 17/416,834

(22) PCT Filed: Nov. 21, 2019

(86) PCT No.: PCT/EP2019/082050
§ 371 (c)(1),
(2) Date: Jun. 21, 2021

(87) PCT Pub. No.: WO2020/126287
PCT Pub. Date: Jun. 25, 2020

(65) Prior Publication Data
US 2022/0082423 A1    Mar. 17, 2022

(30) Foreign Application Priority Data

Dec. 21, 2018  (DE) .................... 10 2018 133 534.2
Mar. 18, 2019  (DE) .................... 10 2019 106 762.6

(51) Int. Cl.
*G01F 1/667*  (2022.01)
*G01F 1/74*   (2006.01)
*G01N 9/00*   (2006.01)

(52) U.S. Cl.
CPC ................ *G01F 1/74* (2013.01); *G01F 1/668* (2013.01); *G01N 9/002* (2013.01)

(58) Field of Classification Search
CPC .......... G01F 1/74; G01F 1/668; G01N 9/002; G01N 2009/006
See application file for complete search history.

(56) References Cited

U.S. PATENT DOCUMENTS

2010/0139416 A1   6/2010  Kolahi
2016/0041286 A1   2/2016  Sinha et al.
(Continued)

FOREIGN PATENT DOCUMENTS

CN   101473196 A   7/2009
CN   102422131 A   4/2012
(Continued)

*Primary Examiner* — Manuel A Rivera Vargas
(74) *Attorney, Agent, or Firm* — Kelly J. Smith; Endress+Hauser (USA) Holding, Inc.

(57) ABSTRACT

A method for ascertaining a physical parameter of a liquid, which has a gas charge using a measuring transducer having a measuring tube for conveying the medium. The measuring tube executes oscillations in bending oscillation mode. The method includes: exciting the measuring tube with an eigenfrequency of a bending oscillation mode—or $f_1$-mode, ascertaining a suppressed excitation frequency, at which the oscillation amplitude of the measuring tube is minimum; identifying the frequency as the resonant frequency of the gas-charged liquid; ascertaining a density correction term as a function of the resonant frequency for correcting a preliminary density measured value and/or mass flow correction term as a function of the resonant frequency for correcting a preliminary mass flow rate measured value, and/or ascertaining the velocity of sound in the gas-charged liquid in the measuring tube as a function of the resonant frequency.

13 Claims, 3 Drawing Sheets

(56) References Cited

U.S. PATENT DOCUMENTS

| | | |
|---|---|---|
| 2016/0349091 A1 | 12/2016 | Huber et al. |
| 2017/0254781 A1 | 9/2017 | Spencer et al. |
| 2020/0271494 A1* | 8/2020 | Zhu ........................ G01N 9/002 |

FOREIGN PATENT DOCUMENTS

| | | |
|---|---|---|
| CN | 107850474 A | 3/2018 |
| CN | 108603777 A | 9/2018 |
| DE | 102009002941 A1 | 11/2010 |
| DE | 102015122661 A1 | 6/2017 |
| DE | 102016005547 A1 | 11/2017 |
| DE | 102016112002 A1 | 1/2018 |
| DE | 102016114974 A1 | 2/2018 |
| EP | 1889010 B1 | 12/2016 |
| WO | 9831990 A1 | 7/1998 |
| WO | 0101086 A1 | 1/2001 |
| WO | 02075261 A2 | 9/2002 |
| WO | 2017194278 A1 | 11/2017 |

* cited by examiner

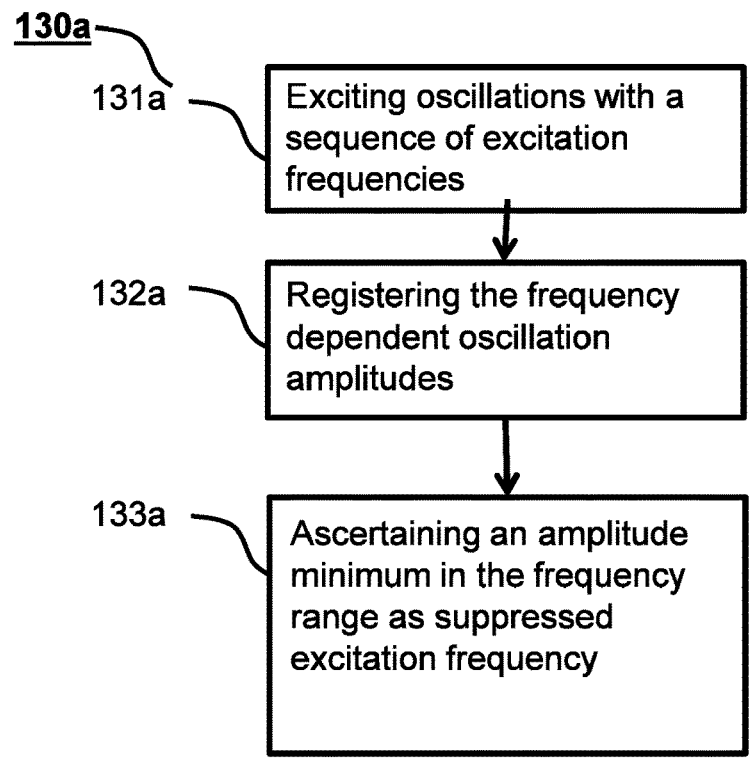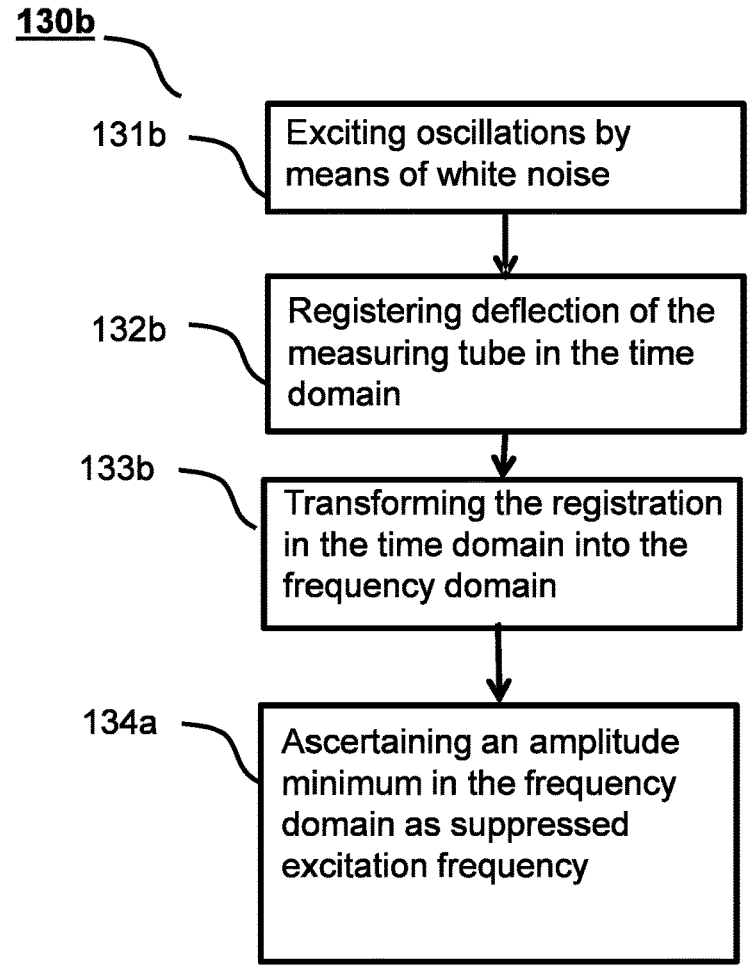

METHOD FOR ASCERTAINING A PHYSICAL PARAMETER OF A GAS-CHARGED LIQUID

CROSS-REFERENCE TO RELATED APPLICATIONS

The present application is related to and claims the priority benefit of German Patent Application Nos. 10 2018 133 534.2, filed on Dec. 21, 2018 and 10 2019 106 762.6, filed Mar. 18, 2019, and International Patent Application No. PCT/EP2019/082050, filed on Nov. 21, 2019, the entire contents of which are incorporated herein by reference.

TECHNICAL FIELD

The present invention relates to a method for ascertaining a physical parameter of a gas-charged liquid by means of a measuring transducer having at least one measuring tube for conveying the gas-charged liquid, wherein the measuring tube has an inlet side end section and an outlet side end section, wherein the measuring transducer has at least one inlet side securement means and one outlet-side securement means, with which the measuring tube is secured, in each case, in one of the end sections, wherein the measuring tube is excitable between the two securement means to execute oscillations, wherein from the oscillatory behavior of the measuring tube mass flow rate and density of the gas-charged liquid are determinable. The measured values for mass flow rate and density have, however, cross sensitivities to velocity of sound in, or compressibility of, the gas-charged liquid, which rises with increasing gas charge. A compensating of these cross sensitivities is, consequently, desired.

BACKGROUND

WO 01/01086 A1 discloses a method for compressibility compensation in the case of mass flow measurement in a Coriolis mass flow measuring device. In such case, mass flow measurement is performed in two different modes, of which one is a bending oscillation mode and another a radial mode. The mass flow rate values ascertained by means of these two modes are compared. Such is, however, a problematic approach, since the radial mode oscillations have considerable dependence on the flow profile and the static pressure. Additionally, more sensors than the usual two are required, in order to be able to register both bending oscillations as well as also radial mode oscillations. Equally, a more complex exciter structure is required.

To a first approximation, a preliminary density value $\rho_i$ of a gas-charged liquid as a function of eigenfrequency $f_i$ of an fi mode can be expressed as:

$$\rho_i = c_{0i} + c_{1i}\frac{1}{f_i^2} + c_{2i}\frac{1}{f_i^4},$$

wherein $c_{0i}$, $c_{1i}$, and $c_{2i}$, are mode dependent coefficients.

The above approximation does not, however, take into consideration the influences of the oscillating, gas-charged liquid in the measuring tube. The closer the resonant frequency of the oscillating, gas-charged liquid lies to the eigenfrequency of a bending oscillation mode, the greater is the influence of the eigenfrequency. Since the resonant frequency lies, usually, above the eigenfrequency of the measuring tubes, the influence on the $f_3$-bending oscillation mode is greater than the influence on the $f_1$-bending oscillation mode. This leads to different preliminary, mode-specific density values, wherein the ratio between the preliminary density values provides the possibility of ascertaining and correcting the influence of the oscillating, gas-charged liquid. Such is described in DE 10 2015 122 661 A1. When, however, the resonant frequency of the gas-charged liquid agrees with an eigenfrequency of a bending oscillation mode, such is completely suppressed. Thus, in this situation, the above described approach does not work. Offenlegungsschrift DE 10 2016 005 547 A1 proposes ascertaining a value for the eigenfrequency of the suppressed bending oscillation wanted mode in this situation by multiplying the eigenfrequency of the excitable bending oscillation wanted mode by a factor. This enables, indeed, a certain improvement of the accuracy of measurement, but since the information to be evaluated is contained in the frequency ratio, ascertaining the unknown second frequency by multiplying a first eigenfrequency by an estimated, not exactly available factor means that one lastly influences the measurement result with a more or less than appropriate model.

SUMMARY

It is, therefore, an object of the present invention to provide an improved solution for these situations.

The object is achieved according to the invention by the method as defined in independent claim 1.

The method of the invention serves for ascertaining a physical parameter of a liquid, which has a gas charge, wherein the gas is present especially in the form of bubbles suspended in the liquid, by means of a measuring transducer having at least one measuring tube for conveying the medium, wherein the at least one measuring tube has an inlet side end section and an outlet side end section, wherein the measuring transducer has at least one inlet side securement means and one outlet-side securement means, with which the measuring tube is secured, in each case, in one of the end sections, wherein the measuring tube is excitable between the two securement means to execute oscillations in at least one bending oscillation mode, wherein the method comprises steps as follows: Exciting the measuring tube with an eigenfrequency of a bending oscillation mode, especially the bending oscillation wanted mode, or $f_1$-mode; ascertaining a suppressed excitation frequency, at which the oscillation amplitude of the measuring tube is minimum, or disappears; identifying the suppressed excitation frequency as the resonant frequency of the gas-charged liquid; ascertaining a density correction term as a function of the resonant frequency for correcting a preliminary density measured value and/or mass flow correction term as a function of the resonant frequency for correcting a preliminary mass flow rate measured value, and/or ascertaining the velocity of sound in the gas-charged liquid in the measuring tube as a function of the resonant frequency.

In an additional development of the invention, the suppressed excitation frequency is ascertained by sampling a frequency range, wherein the sampling of the frequency range comprises especially the outputting of excitation signals having a sequence of excitation frequencies in the frequency range for exciting measuring tube oscillations, and the registering of the frequency dependent oscillation amplitudes.

In an additional development of the invention, the suppressed excitation frequency is ascertained by: Exciting oscillations with an excitation signal in the form of white noise; registering resulting deflection of the measuring tube in the time domain; transforming the registration in the time domain into the frequency domain, especially by means of an FFT; ascertaining frequency of an amplitude minimum; and identifying the ascertained frequency as the suppressed excitation frequency.

In an additional development of the invention, the method further includes ascertaining a preliminary density measured value and/or a preliminary mass flow rate measured value at the eigenfrequency of the excited bending oscillation mode, and ascertaining a corrected density measured value and/or a corrected mass flow rate measured value using the density correction term and/or the mass flow correction term, wherein the density correction term and/or the mass flow correction term are, or is, a function of the resonant frequency and the eigenfrequency of the excited bending oscillation mode, at which the preliminary density measured value and/or the preliminary mass flow rate measured value were, or was, ascertained.

In an additional development of the invention, the density correction term $K_i$ for a preliminary density value and/or the mass flow correction term are, or is, a function of a quotient of the resonant frequency of the gas-charged liquid and the eigenfrequency of the excited bending oscillation mode, at which the preliminary density measured value and/or mass flow rate measured value were, or was, ascertained.

In an additional development of the invention, the density correction term $K_i$ for the preliminary density values $\rho_i$ based on the eigenfrequency of the $f_i$-mode has the following form:

$$K_i := \left(1 + \frac{r}{\left(\frac{f_{res}}{f_i}\right)^2 - b}\right),$$

wherein $$\rho_{corr} := \frac{\rho_i}{K_i}$$

wherein r is a media independent constant, $f_{res}$ is the resonant frequency of the gas-charged liquid, $f_i$ is the eigenfrequency of the excited bending oscillation mode, $\rho_{corr}$, $\rho_i$ are the corrected and the preliminary densities, and b is a scaling constant. In an embodiment of this additional development: r/b<1, especially r/b<0.9, wherein especially: b=1.

In an additional development of the invention, g is a proportionality factor between a resonant frequency $f_{res}$ of the gas-charged liquid and the velocity of sound in the gas-charged liquid and depends on the diameter of the measuring tube, thus, $$c = \frac{f_{res}}{g},$$

and a value of the velocity of sound ascertained with the equation is output.

In an additional development of the invention, the preliminary density value is determined based on the eigenfrequency of the $f_i$-mode by means of a polynomial in $1/f_i$, especially in $(1/f_i)^2$, wherein the coefficients of the polynomial are mode dependent.

In an additional development of the invention, a density error $E_{\rho i}$ of a preliminary density value based on the eigenfrequency of the fi mode is:

$$E_{\rho i} := K_i - 1,$$

wherein a mass flow rate error $E_m$ of a preliminary mass flow rate value is proportional to the density error $E_{\rho 1}$ of the first preliminary density value, thus:

$$E_m := k \cdot E_{\rho 1},$$

wherein the proportionality factor k amounts to not less than 1.9 and no more than 2.1, wherein the proportionality factor k especially amounts to 2, wherein the mass flow correction term $K_m$ for the mass flow rate is:

$$K_m := 1 + E_m,$$

wherein the corrected mass flow rate $\dot{m}_{corr}$ is $$\dot{m}_{corr} := \frac{\dot{m}_v}{K_m},$$

wherein $\dot{m}_v$ is the preliminary mass flow rate value.

In an additional development of the invention, the $f_1$-mode and the $f_3$-mode are excited, wherein their eigenfrequencies are ascertained, wherein as a function of the ascertained eigenfrequencies a frequency range is established, in which the suppressed excitation frequency is to be sought.

In an additional development of the invention, a reference density, especially for the liquid phase of the medium, is provided, wherein as a function of the reference density and, in given cases, the eigenfrequency of the $f_1$-mode a frequency range is established, in which the suppressed excitation frequency is to be sought.

BRIEF DESCRIPTION OF THE DRAWINGS

The invention will now be explained in greater detail based on the example of an embodiment illustrated in the drawing.

The figures of the drawing show as follows:

FIG. 2a shows a flow diagram of a first embodiment for ascertaining a suppressed excitation frequency in the example of an embodiment of FIG. 1; and FIG. 2b shows a flow diagram of a second embodiment for ascertaining a suppressed excitation frequency in the example of an embodiment of FIG. 1.

DETAILED DESCRIPTION

Figure 1:
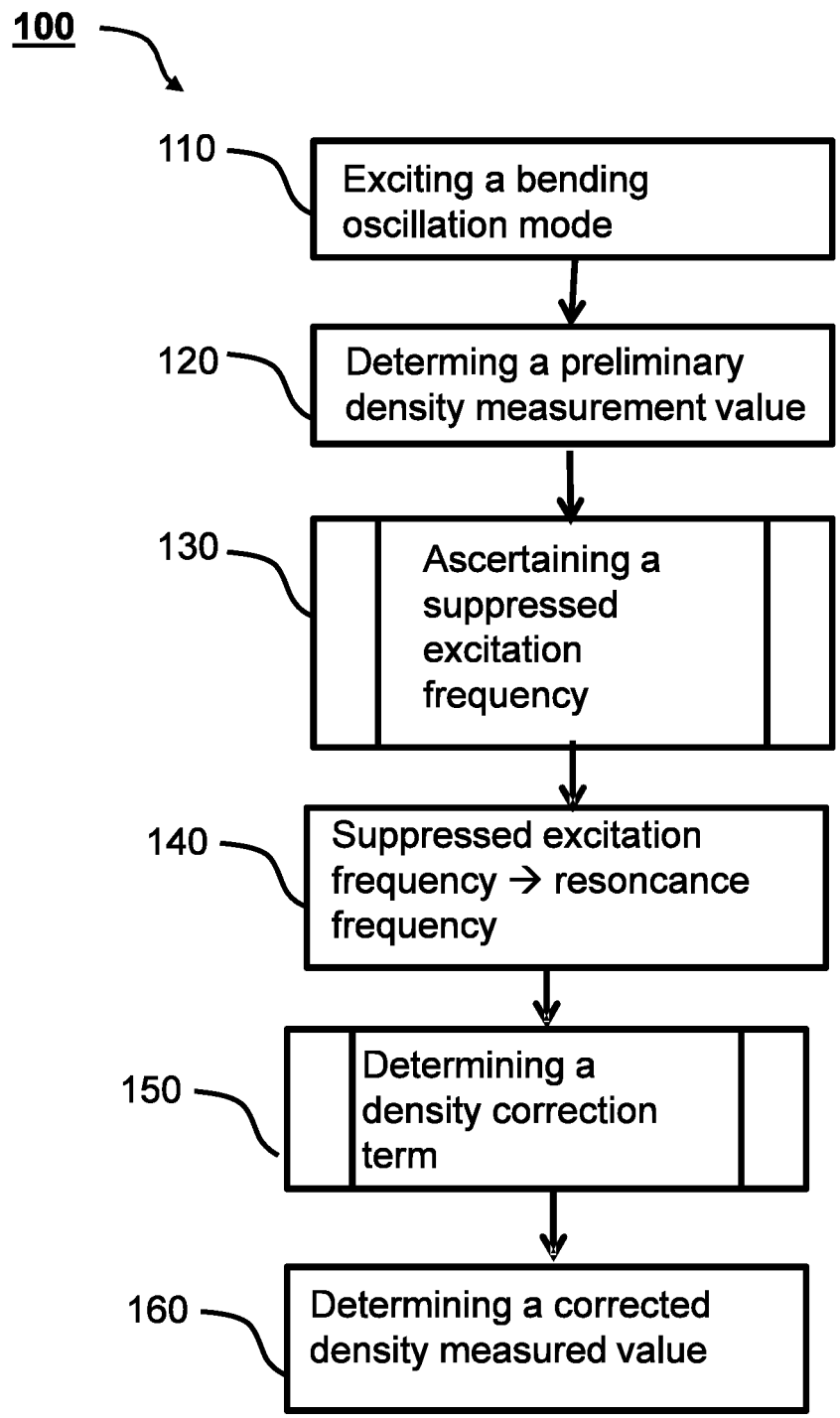
FIG. 1 shows a flow diagram of an example of an embodiment of the method of the present disclosure.

The example of an embodiment of a method 100 of the invention shown in FIG. 1 for determining density value begins in a step 110 with the exciting of a bending oscillation mode, especially the $f_1$-mode, which is also referred to as bending oscillation wanted mode.

Then there occurs the determining of the eigenfrequency of the excited bending oscillation mode, for example, of the $f_1$-mode, for example, as a result of maximizing the ratio of the oscillation amplitude to the mode specific excitation power. By varying the excitation frequencies, the sought eigenfrequencies can be ascertained.

Based on the ascertained eigenfrequency $f_i$, then in a step 120 a preliminary density measured value $\rho_1$ is determined as:

$$\rho_i = c_{0i} + c_{1i}\frac{1}{f_i^2} + c_{2i}\frac{1}{f_i^4},$$

wherein $c_{0i}$, $c_{1i}$, and $c_{2i}$, are mode dependent coefficients.

In a step 130, which is explained in greater detail below based on FIGS. 2a and 2b, there occurs the determining of a suppressed excitation frequency, which in a step 140 is set as value of the resonant frequency $f_{res}$ of the gas-charged liquid in the measuring tube.

In a step 150, there occurs based on the eigenfrequency $f_i$ of the measuring tube and the resonant frequency $f_{res}$ the determining of a density correction term for density measurement.

Finally, in a step 160, a corrected density value is determined by means of the correction term.

FIG. 2a represents a first embodiment 130a for the method step for ascertaining the suppressed excitation frequency.

Oscillations are excited with a sequence of excitation frequencies 131a over a frequency range, in which the suppressed excitation frequency is to be expected. In order to identify the frequency range, for example, based on the preliminary density and a reference value for density of the liquid, a rough estimate of the resonant frequency of the medium can occur, wherein then a frequency range around the estimated value is selected. In similar manner, a resonant frequency can be estimated from the ratio of the eigenfrequencies, for example, of the $f_1$-mode and the $f_3$-mode.

For each of the excited frequencies, a frequency dependent oscillation amplitude is registered 132a.

In the spectrum of the oscillation amplitudes produced in this way, then an amplitude minimum is ascertained, which is identified as the suppressed excitation frequency 133a.

FIG. 2b represents a second embodiment 130b for the method step for ascertaining the suppressed excitation frequency.

Here, simultaneously, oscillations of all frequencies are excited with an excitation signal in the form of white noise 131b, wherein then oscillation deflection is registered as a function of time 132b. A Fourier transformation, especially FFT, 133b transforms the time domain into the frequency domain, wherein then such as described above an amplitude minimum as a function of frequency is ascertained and identified as suppressed excitation frequency 134b. For each of the excited frequencies, a frequency dependent oscillation amplitude is registered 132a.

For determining the density correction term $K_i$ as in step 150, the resonant frequency fres and the eigenfrequency fi applied for ascertaining the preliminary density value are entered into the following equation:

$$K_i := \left(1 + \frac{r}{\left(\frac{f_0}{f_i}\right)^2 - 1}\right),$$

wherein $f_i$ is the eigenfrequency of the not suppressed bending oscillation mode, with which the preliminary $\rho_i$ density measured value was determined, and r is a constant, which, in this case, has the value 0.84.

The corrected density measured value $\rho_{corr}$ is, finally, calculated in the step 160 of the method in FIG. 1 according to:

$$\rho_{corr} = \frac{\rho_i}{K_i}$$

The preliminary density value $\rho_i$ is, thus, divided by the correction term $K_i$, in order to obtain the corrected density value $\rho_{corr}$.

Figure 3:
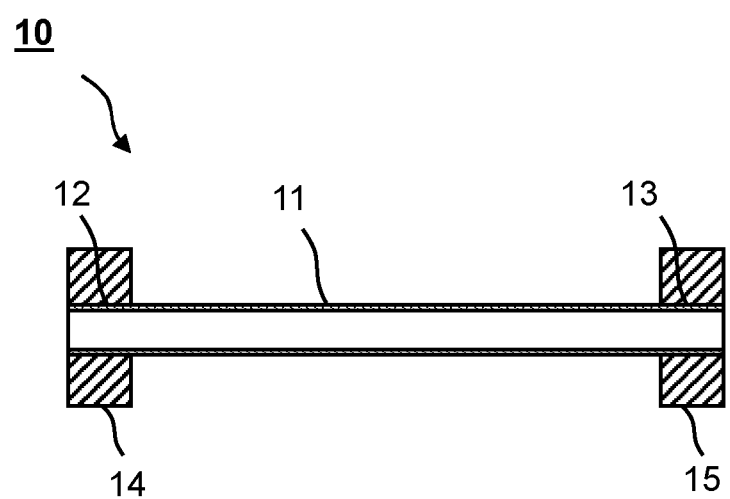
FIG. 3 is a schematic drawing of a measuring transducer for carrying out the invention.

FIG. 3 shows an embodiment of a measuring transducer 10 having at least one measuring tube 11 for conveying a medium. The at least one measuring tube 11 has an inlet side end section 12 and an outlet side end section 13. The measuring transducer 10 has at least one inlet side securement means 14 and one outlet-side securement means 15 with which the measuring tube 11 is secured, in each case, in one of the end sections. The measuring tube is excitable between the two securement means to execute oscillations in at least one bending oscillation mode.

The invention claimed is:

1. A method for ascertaining a physical parameter of a liquid, which has a gas charge, wherein the gas is present especially in the form of bubbles suspended in the liquid using a measuring transducer having at least one measuring tube for conveying a medium,
   wherein the at least one measuring tube has an inlet side end section and an outlet side end section,
   wherein the measuring transducer has at least one inlet side securement and one outlet-side securement, with which the measuring tube is secured, in each case, in one of the end sections, wherein the measuring tube is excitable between the two securements to execute oscillations in at least one bending oscillation mode, wherein the method comprises steps as follows:
   exciting the measuring tube with an eigenfrequency of a bending oscillation mode,
   ascertaining a suppressed excitation frequency, at which the oscillation amplitude of the measuring tube is minimum, or disappears;
   identifying the suppressed excitation frequency as the resonant frequency of the gas-charged liquid;
   ascertaining a density correction term as a function of the resonant frequency for correcting a preliminary density measured value or mass flow correction term as a function of the resonant frequency for correcting a preliminary mass flow rate measured value, or ascertaining the velocity of sound in the gas-charged liquid in the measuring tube as a function of the resonant frequency.

2. The method of claim 1, wherein the suppressed excitation frequency is ascertained by sampling a frequency range.

3. The method of claim of claim 2, wherein the sampling of the frequency range comprises outputting excitation signals having a sequence of excitation frequencies in the frequency range for exciting measuring tube oscillations and registering frequency dependent oscillation amplitudes.

4. The method of claim 1, wherein the suppressed excitation frequency is ascertained by:
   exciting oscillations with an excitation signal in the form of white noise;

registering resulting deflection of the measuring tube in the time domain;

transforming the registration in the time domain into the frequency domain;

ascertaining frequency of an amplitude minimum; and identifying the ascertained frequency as the suppressed excitation frequency.

5. The method of claim 1, further comprising:

ascertaining a preliminary density measured value or a preliminary mass flow rate measured value at the eigenfrequency of the excited bending oscillation mode, and ascertaining a corrected density measured value or a corrected mass flow rate measured value using the density correction term or the mass flow correction term, wherein the density correction term or the mass flow correction term are, or is, a function of the resonant frequency and the eigenfrequency of the excited bending oscillation mode, at which the preliminary density measured value or the preliminary mass flow rate measured value were, or was, ascertained.

6. The method of claim 1, wherein the density correction term $K_i$ for a preliminary density value or the mass flow correction term are, or is, a function of a quotient of the resonant frequency of the gas-charged liquid and the eigenfrequency of the excited bending oscillation mode, at which the preliminary density measured value or mass flow rate measured value were, or was, ascertained.

7. The method of claim 1, wherein the density correction term $K_i$ for the preliminary density values $\rho_i$ based on the eigenfrequency of the $f_i$-mode has the following form:

$$K_i := \left(1 + \frac{r}{\left(\frac{f_{res}}{f_i}\right)^2 - b}\right),$$

wherein $$\rho_{corr} := \frac{\rho_i}{K_i}$$

wherein r is a median independent constant, $f_{res}$ is the resonant frequency of the gas-charged liquid, $f_i$ is the eigenfrequency of the excited bending oscillation mode, $\rho_{corr}$, $\rho_i$ are the corrected and the preliminary densities, and b is a scaling constant.

8. The method of claim 1, wherein:

r/b<1, especially r/b<0.9, wherein especially: b=1.

9. The method of claim 1, wherein g is a proportionality factor between a resonant frequency $f_{res}$ of the gas-charged liquid and the velocity of sound in the gas-charged liquid and depends on the diameter of the measuring tube, wherein thus, $$c = \frac{f_{res}}{g},$$

and a value of the velocity of sound ascertained with the equation is output.

10. The method of claim 1, wherein the preliminary density values are determined based on the eigenfrequency of the $f_i$-mode using a polynomial in $1/f_i$, wherein the coefficients of the polynomial are mode dependent.

11. The method of claim 1, wherein a density error $E_{\rho i}$ of a preliminary density value based on the eigenfrequency of the $f_i$ mode is:

$$E_{\rho i} := K_i - 1,$$

wherein a mass flow rate error $E_m$ of a preliminary mass flow rate value is proportional to the density error $E_{\rho i}$ of the first preliminary density value, thus:

$$E_m := k \cdot E_{\rho 1},$$

wherein the proportionality factor k amounts to not less than 1.9 and no more than 2.1, wherein the proportionality factor k especially amounts to 2, wherein the mass flow correction term $K_m$ for the mass flow rate is:

$$K_m := 1 + E_m,$$

wherein the corrected mass flow rate $\dot{m}_{corr}$ is $$\dot{m}_{corr} := \frac{\dot{m}_v}{K_m},$$

wherein $\dot{m}_v$ is the preliminary mass flow rate value.

12. The method of claim 1, wherein the $f_1$-mode and the $f_3$-mode are excited and their eigenfrequencies ascertained, and wherein as a function of the ascertained eigenfrequencies a frequency range is established, in which the suppressed excitation frequency is to be sought.

13. The method of claim 1, wherein a reference density is provided and wherein as a function of the reference density and, in given cases, the eigenfrequency of the $f_1$-mode a frequency range is established, in which the suppressed excitation frequency is to be sought.

* * * * *